July 21, 1942. G. A. UNGAR Re. 22,142
SYSTEM AND APPARATUS FOR PUMPING HAZARDOUS LIQUIDS
Original Filed May 11, 1933 7 Sheets-Sheet 1
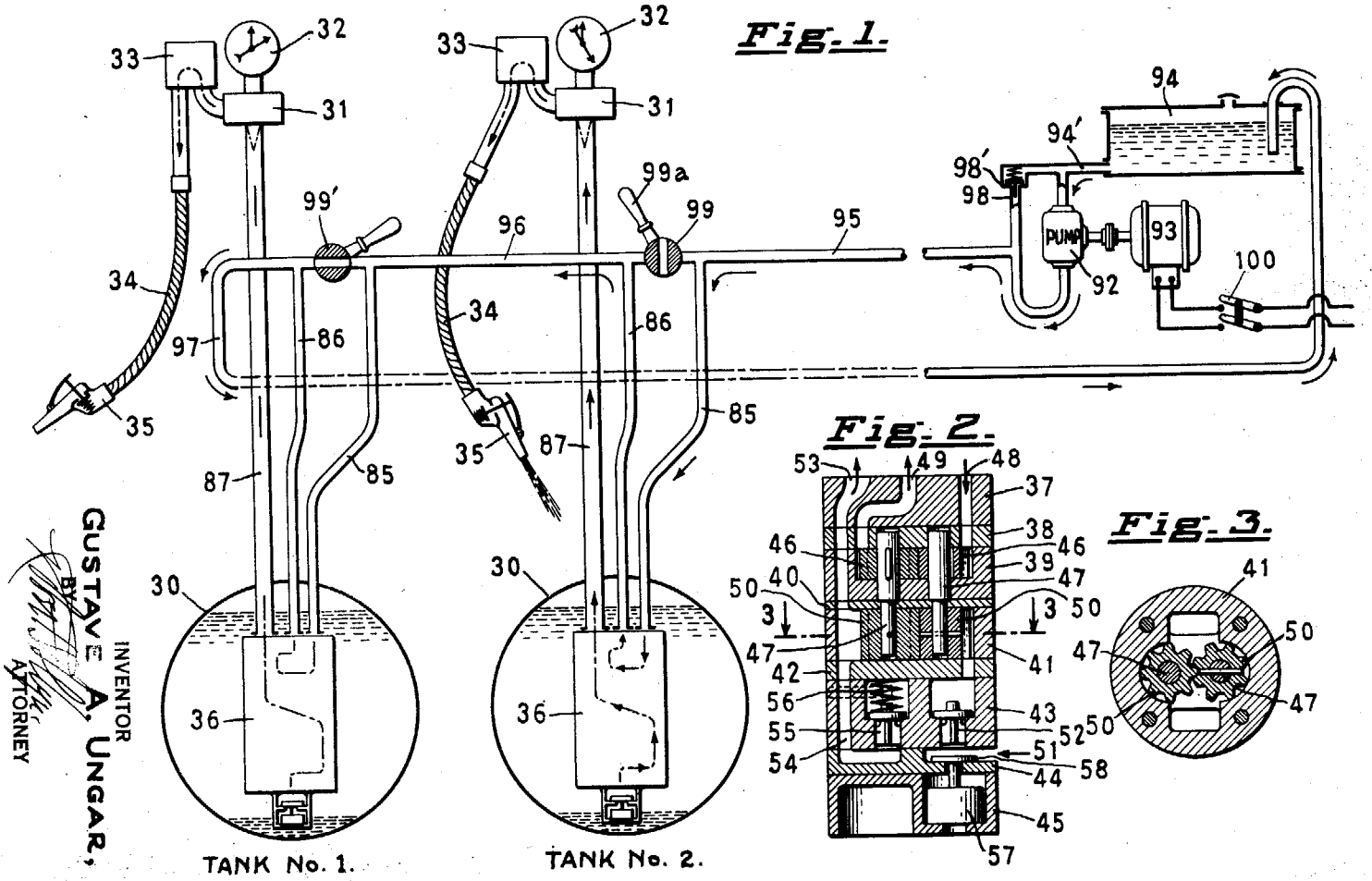
INVENTOR
GUSTAVE A. UNGAR,
BY
ATTORNEY SYSTEM AND APPARATUS FOR PUMPING HAZARDOUS LIQUIDS
Original Filed May 11, 1933 7 Sheets-Sheet 2
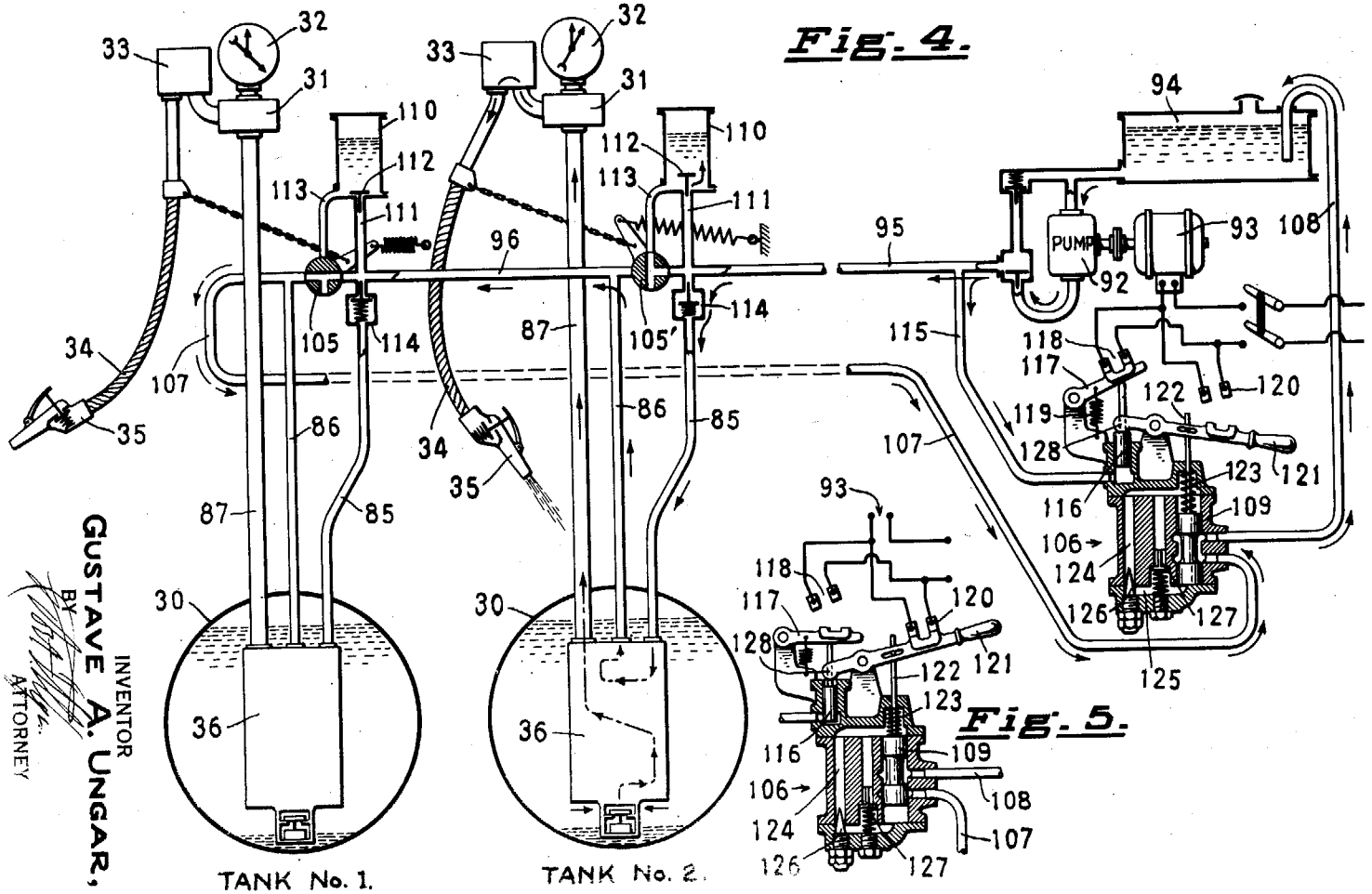
INVENTOR
GUSTAVE A. UNGAR,
BY
ATTORNEY July 21, 1942. G. A. UNGAR Re. 22,142
SYSTEM AND APPARATUS FOR PUMPING HAZARDOUS LIQUIDS
Original Filed May 11, 1933 7 Sheets-Sheet 3
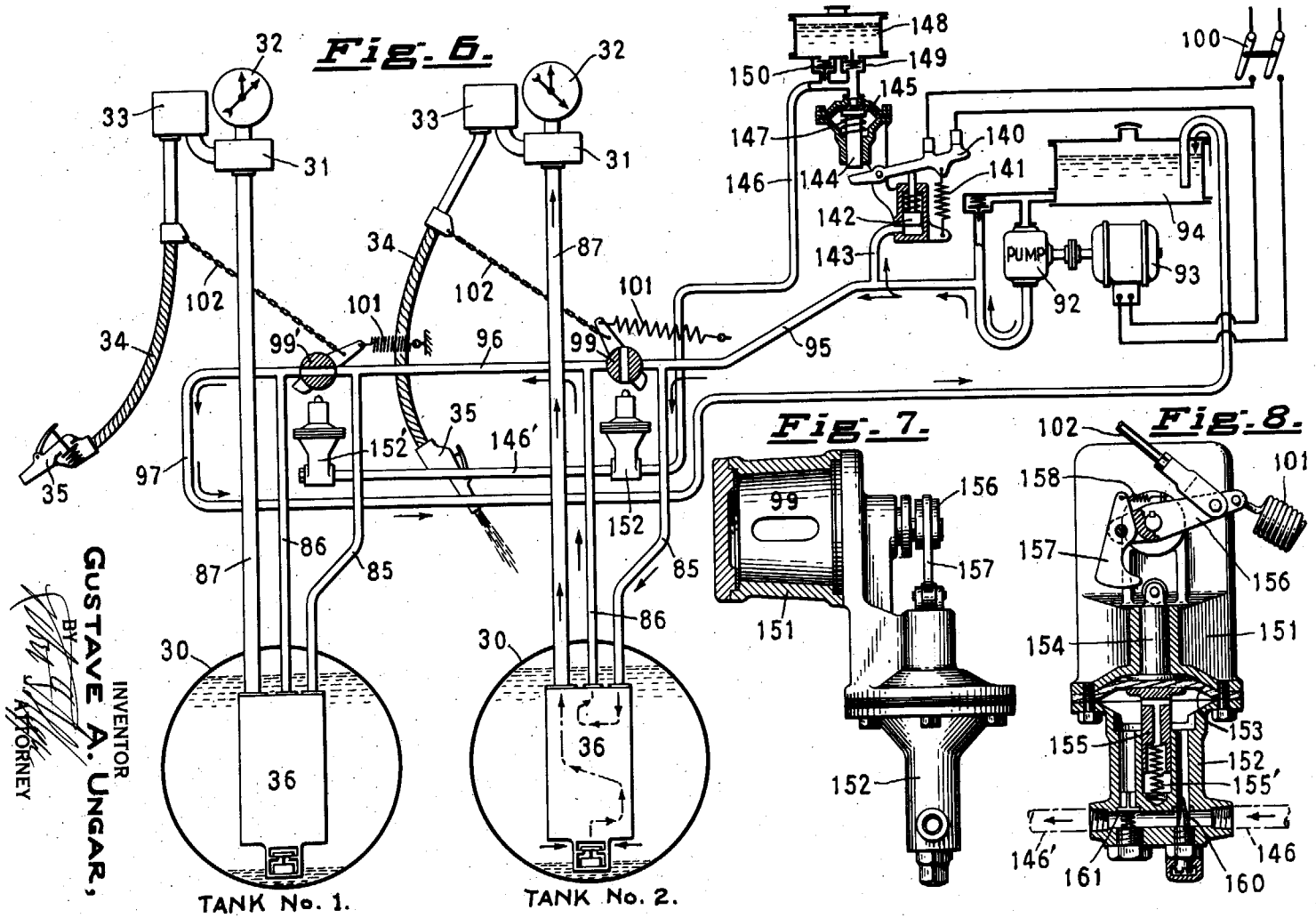
INVENTOR
GUSTAVE A. UNGAR,
BY
ATTORNEY

SYSTEM AND APPARATUS FOR PUMPING HAZARDOUS LIQUIDS

Original Filed May 11, 1933 7 Sheets-Sheet 4

INVENTOR
GUSTAVE A. UNGAR,
BY
ATTORNEY

SYSTEM AND APPARATUS FOR PUMPING HAZARDOUS LIQUIDS

Original Filed May 11, 1933 7 Sheets-Sheet 5

INVENTOR
GUSTAVE A. UNGAR,
BY
ATTORNEY

July 21, 1942. G. A. UNGAR Re. 22,142
SYSTEM AND APPARATUS FOR PUMPING HAZARDOUS LIQUIDS
Original Filed May 11, 1933 7 Sheets-Sheet 6
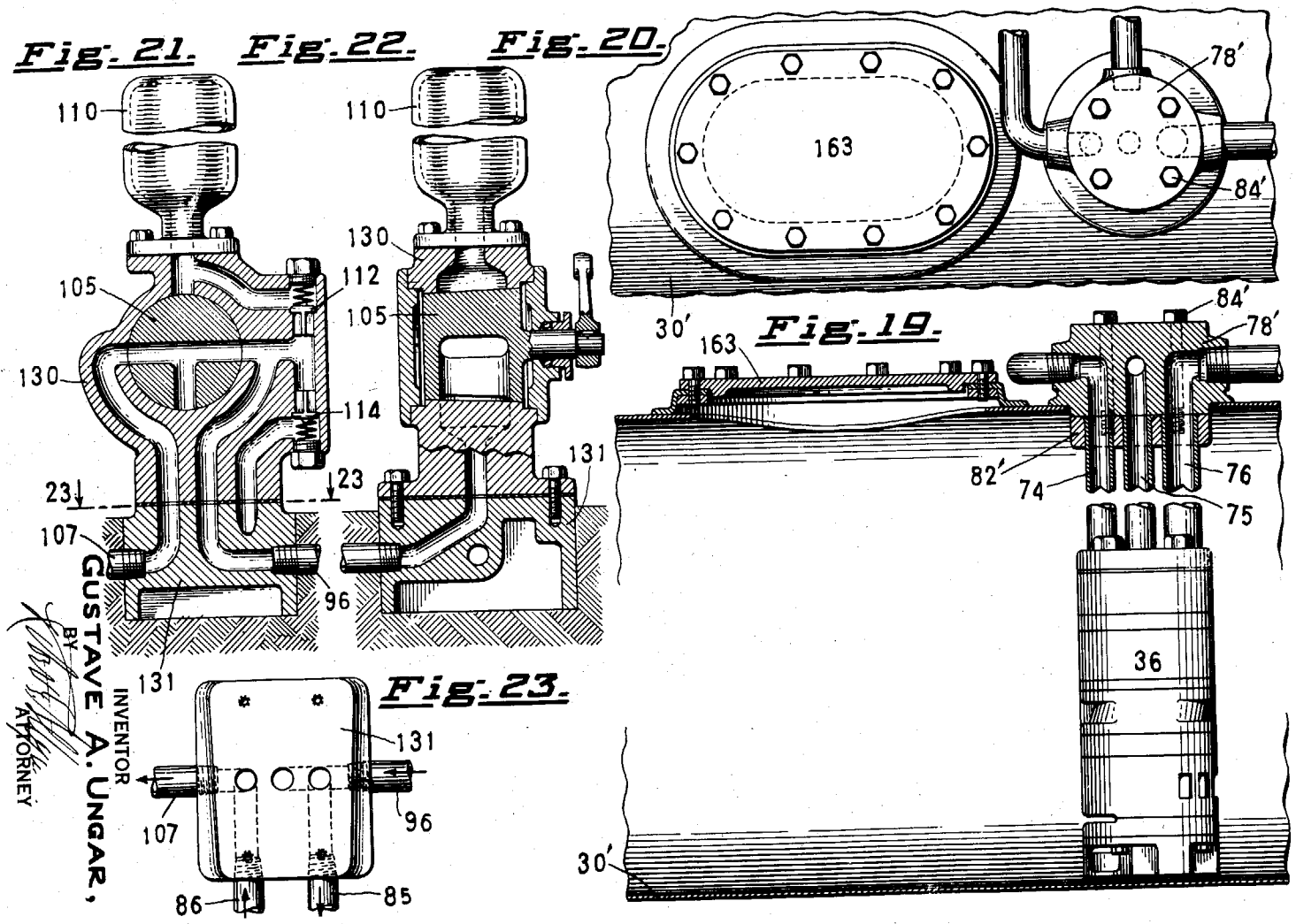
INVENTOR
GUSTAVE A. UNGAR,
BY
ATTORNEY

SYSTEM AND APPARATUS FOR PUMPING HAZARDOUS LIQUIDS

Original Filed May 11, 1933 7 Sheets-Sheet 7

INVENTOR
GUSTAVE A. UNGAR,
BY
ATTORNEY

Reissued July 21, 1942 Re. 22,142

UNITED STATES PATENT OFFICE 22,142

SYSTEM AND APPARATUS FOR PUMPING HAZARDOUS LIQUIDS

Gustave A. Ungar, Pelham Manor, N. Y., assignor to Joseph F. Keller, New York, N. Y.

Original No. 2,102,140, dated December 14, 1937, Serial No. 670,426, May 11, 1933. Application for reissue December 11, 1939, Serial No. 308,735

31 Claims. (Cl. 221—95)

My invention relates particularly to the handling of what are commonly termed hazardous liquids which are required to be stored and from time to time dispensed in controlled quantities. Such liquids are sometimes themselves inflammable at relatively low temperatures and other liquids form vapors which are inflammable and when combined with air highly explosive.

The storage of such liquids has been a difficult and dangerous problem. In fact, according to the usual methods the danger is so great that the insurance rates are extremely high and in some instances prohibitive from the standpoint of usual insurance risks.

The new oil-hydraulic system has been developed with a view to eliminate the fire hazard and the unreliability of all existing methods used to pump inflammable liquids. While the following description principally describes the system as employed for the dispensing of gasoline, it is apparent that the principle is of equal importance for other uses such as the unloading of gasoline tank trucks, the unloading of bulk tanks or of ships' bunkers containing inflammable liquids, etc. This new oil-hydraulic system is based upon the definite elimination of the possibility of forming explosive mixtures of vapor and air which are ever present with suction lines, and also upon the removal of external stuffing boxes, belt or gear drives and of electric motors, switches and power conduits entirely from the vicinity of all parts containing inflammable liquids.

The pump which handles the inflammable liquid is driven by means of an oil-hydraulic motor with which it forms an integral unit. This unit is placed inside the tank containing the inflammable liquid, or if this is impossible for structural reasons, right on top of the tank. In this manner the inflammable liquid is forced out and not sucked out, and therefore the possibility of forming vapors by suction is definitely eliminated. The unit consisting of the pump handling the inflammable liquid and of its oil-hydraulic motor has no external moving parts which may cause friction and heat and consequently produce fire hazard. It is therefore possible to submerge this unit into the inflammable liquid. The pump handling the inflammable liquid is of such a design that there is no mechanical contact or friction of the moving parts. The oil operated motor is always submerged in the oil or other suitable lubricating hydraulic liquid, which lubricates all its moving parts. A self-adjusting packing device prevents leakage of the hydraulic oil into the pump. The oil-hydraulic motor is supplied with oil from a remote oil pump which can be driven by any suitable power source, since it is away from the hazardous vicinity of the inflammable liquid.

The system in its simplest form is shown diagrammatically as applied to a gasoline dispensing station consisting of two units.

With the conventional electric pumping station, each underground tank requires a suction line of forty feet average length between tank and pump and in many instances considerably longer. With the center of the tank six feet below ground, a considerable suction lift has to be overcome, causing formation of gasoline vapor, which frequently, with high test gasoline, causes vapor-lock, i. e., stoppage of the flow of liquid through the suction pipe. If there is the slightest leak in the pipe, air is sucked in, producing a highly inflammable mixture, which at the same time considerably affects the accuracy of the meter. The pump must be driven by means of vapor-proof electric motors, but in spite of special motor designs and the greatest care exerted in construction and installation of wiring and switches, their close vicinity to gasoline and gasoline vapor carrying parts constitutes an ever present great fire hazard.

With gasoline tanks within buildings, the suction lift is considerable. The gasoline tanks being installed two feet below cellar floor, undue suction lifts from eighteen to twenty feet for dispensing stands located on the street level are not at all uncommon and it is practically impossible to avoid gasoline vapor formation under such conditions.

Conventional electric units are equipped with air eliminators to remove air and vapor between pumps and meters, since with gasoline suction lines it is impossible to arrange air and gas eliminating devices until the mixture has passed through the pump. The formation of explosive mixtures is therefore always threatened between tank and meter. The air and vapor eliminators used with all electric pumping types installed inside of buildings represent a particular fire hazard since they discharge the air and vapor contents of the suction line and tank right into the building. This discharge from vapor eliminators can be ignited, producing a flame which may be several feet long, like a blow torch.

With all pumps having long suction lines, the rate of gasoline discharge varies with the change of the liquid level in the underground tank. This variation has a decided effect upon the rate of pump delivery and consequently upon the accuracy of the meters.

As will be seen, the new oil-hydraulic system operates without gasoline suction lines. The pump-motor unit will be described in detail later, as will also be the mounting of this unit in relation to the tank.

One arrangement provides for manual control. A master oil pump of suitable design, preferably of the positive displacement type, so as to make its rate of delivery independent of the working pressure, is located a safe distance away from the gasoline tanks and stands. It is driven by means of an electric motor with a manually operated switch.

A bypass valve is provided to protect motor, pump and oil lines against excessive pressure.

An oil pressure line leads from the pump to a control valve located in the nearest dispensing stand, from there to the valve in next stand, and then to as many stands as it is desired to operate from one master pump. An oil return line leads back to the oil reservoir from the last stand. Each oil-hydraulic control valve is connected by means of an oil inlet and oil outlet line with its pump-motor unit located inside the gasoline tank. Each unit is connected with its stand also through a gasoline discharge pipe, which leads through a suitable strainer to a meter with its dial, then through a gasoline hose to the dispensing nozzle.

The pump-motor unit inside the tank is provided with a foot-valve in order to keep the entire gasoline line full of liquid so as to prevent the passage of air or vapor through the meter when starting the unit. There is no danger of the pump ever losing its prime even if the foot valve should leak, since the pump inlet is always submerged in gasoline. A bypass valve is also arranged, which opens in case of excess pressure, permitting the liquid under pressure to return directly into the tank without having to travel first through long return lines. Built into the hydraulic pump-motor unit is also a water trap valve of the conventional type. If the water level in the tank rises above a certain predetermined height, then the float lifts up the valve and prevents any liquid from entering the pump until the water has been taken out of the tank through separate openings provided for this purpose.

Gasoline always enters the pump intake by streaming horizontally over the water trap valve. This prevents any possibility of picking up any of the dirt or mud, which is at the bottom of the tank and which accumulates particularly near the separating surface between water and gasoline.

One of the objects of the present invention is to provide a service station pump for gasoline and similar fluids comprising a housing having an aperture through which a length of the hose is adapted to pass and which housing is adapted to enclose a portion of the liquid dispensing line and the liquid measuring means, such as a liquid displacement meter, and through which line, displacement meter and hose, liquid is adapted to flow under pressure upon opening of the customary valve located at the terminal nozzle of the hose; together with means associated with the line for maintaining a portion of the line, the meter and the hose, full of liquid after the cessation of the dispensing operation; and wherein means is provided in association with the housing for permitting a predetermined length of the flexible hose to be pulled through the hose aperture of the housing for the purpose of extending the reach of the hose to varying distances and thereafter said means automatically retrieves such length of hose in stored condition within the housing, the arrangement being such that the withdrawal movement of the hose and the subsequent retraction and storing of the hose within the housing takes place while such flexible hose and connected meter are maintained full of liquid, whereby to preserve accurate measurement by the meter of the liquid to be dispensed during a subsequent dispensing operation.

One of the forms of the invention herein disclosed comprises a novel construction of a service station pump wherein the housing is provided with hose storing means normally arranged to store a predetermined length of flexible hose within the housing when not in use, but constructed and arranged so that when the nozzle of the hose is pulled out of the housing such length of flexible hose is progressively withdrawn from the housing to dispensing position, there being means associated with the hose storing device whereby on the withdrawal of the hose from the housing, control means is automatically actuated to cause dispensing flow to take place continuously through the dispensing line and hose when the nozzle valve has been opened, and/or alternatively when the tension on the nozzle end of the hose is relieved, the hose mounting means automatically retracts the hose into the housing and automatically stops fluid flow through the hose.

This form of the invention also includes, as an ancillary feature, the provision whereby at least part of the hose storing means is shifted relatively to or part way out of the housing during the yielding or extension movement of the hose from the housing and is automatically drawn back within or into the housing upon the automatic retraction of the hose into the housing. This aspect of the invention may also include the utilization of a portion of the hose storing means as a support for the hose nozzle when not in use, whereby the latter may be enclosed within the housing when the hose is retracted therein.

Yet another aspect of the invention resides in the provision of a liquid dispensing device for dispensing gasoline or similar liquid fuels from underground tanks wherein means is disposed in the underground tank and adapted to be operated by the rise in the liquid level of collected water in the tank, but not operated by a rise in the gasoline level therein, for stopping flow through the dispensing line in the event that the water level reaches a predetermined height in the bottom of the tank.

Another objective feature of the invention resides in supporting an intermediate portion of the flexible hose relatively to its housing, the supporting means being shiftable away from the housing during the operation of extending the nozzle to the point of liquid delivery, whereby during such shifting movement a greater range of filling action of the hose is provided.

Another object of the invention is to provide an improved pumping structure for use in a dispensing apparatus and the like wherein a pump, its associated driving motor, and its operatively associated pipe connections is insertable as a unit within an underground tank or the like, and readily removable as a unit therefrom for servicing, repair, et cetera.

The invention also contemplates these and other objects and features not hereinbefore specifically enumerated but which will be apparent from a perusal of the following specification when taken in connection with the accompanying drawings, wherein:

Fig. 1 is a diagrammatic vertical projection and partial section of a simplified form of apparatus embodying my invention, showing two liquid dispensing stands or stations served from a common remotely located liquid pressure source and each controlled by a hand actuated valve;

Fig. 2 is a sectional view partly diagrammatic illustrating one of the combined liquid motor and pumping units;

Fig. 3 is a transverse sectional view of the same on the plane of the line 3—3 of Fig. 2;

Fig. 4 is a diagrammatic elevation and partial section in which the remotely located pressure source is started and stopped automatically by manually controlled demand at a dispensing station;

Fig. 5 is a sectional view of a part of the control mechanism shown in Fig. 4, the electric switches being shown in different positions in the two figures;

Fig. 6 is a diagrammatic view of another modification of the system in which the starting of the common remotely located power source is controlled by the demand at a dispensing station and in which the power or pressure source is stopped automatically when the demand at all stations ceases;

Fig. 7 is a side view and partial section of one of the control valves located at a dispensing station of the system shown in Fig. 6;

Fig. 8 is a sectional view and side elevation of the same;

Fig. 19 is a fragmentary view showing another method of installation of one of the liquid motor and pump units in connection with the storage reservoir which might or might not be located below ground;

Fig. 20 is a plan view of the same;

Fig. 21 is a vertical sectional view of one of the pressure and control units required for the system shown diagrammatically in Fig. 4;

Fig. 22 is a vertical sectional view of the same on a plane generally at right angles to that of the view of Fig. 21;

Fig. 23 is a plan and section on the plane of the line 23—23 of Fig. 21;

Fig. 1 shows two storage tanks 30, 30 but it will be understood that one or more storage tanks may be employed in such a system with suitable regard to the capacity of the master power unit. These storage tanks ordinarily will be located underground but obviously the invention is not limited to the particular construction or location of the storage tanks.

Figure 10:
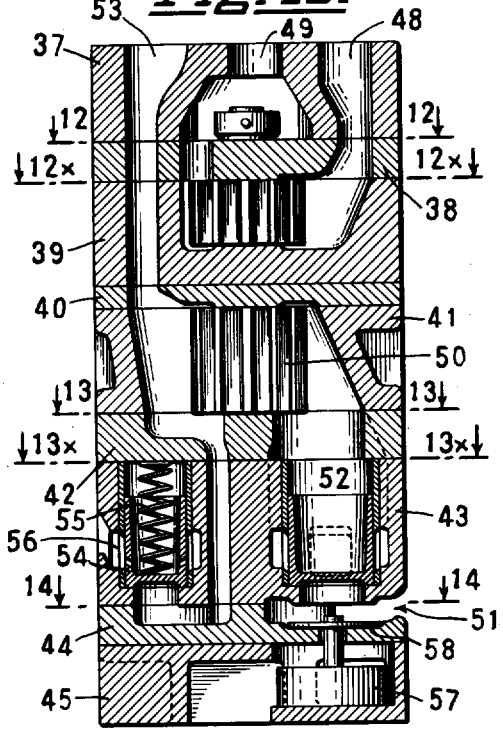
Fig. 10 is a vertical sectional view of the motor and pump unit principally on the plane of the line 10—10 of Fig. 12.

I have illustrated the invention as applied to a stand or station for the dispensing of a liquid such as gasoline and certain features of the invention are particularly applicable to such apparatus, but it should be understood that other features are broadly applicable to the storage and service of other liquids which do not have the same commercial and practical requirements for dispensing.

In the form shown each stand has the customary liquid measuring device or liquid displacement meter 31 with its indicator 32 and a visible gauge 33, a flexible hose 34 and a discharge nozzle 35, having the usual manually controlled nozzle valve and the usual hand actuated means for opening the valve. The problem then is to force the liquid from the tank 30 through the meter, gauge, hose and nozzle to some receptacle.

Power unit 36 is located preferably within the tank although in some cases, as will hereinafter appear, the unit might be located upon or adjacent the storage tank.

This power unit consists of a casing which may conveniently be made up of a series of sections, namely, a manifold or head 37, an upper bearing unit and motor head 38, a liquid motor housing 39 which carries the lower bearings, an intermediate sealing member 40 forming the upper head of the pump unit 41, a liquid pump member 41, a lower pump head 42, a housing 43, containing a bypass and foot valve, a pump inlet member 44, and a water trap member 45.

The liquid motor may be of any suitable type but preferably of the positive displacement type. Fig. 2 shows diagrammatically a so-called gear type having the gears 46, 46 as the motor elements mounted on shafts 47 which are suitably supported in the casing. The liquid, such as oil, for driving the motor is led into the unit casing through an inlet passage 48 and discharged through a passage 49. In other words, the passage of the liquid under pressure through the casing rotates the motor elements 46, 46 and drives the shafts 47, 47. These shafts also have on their lower ends the pump elements 50, 50 which may be of any suitable type but preferably of a type in which metal-to-metal contact between the pumping elements is avoided, such for instance as in the positive displacement type having cam shaped rotors or toothed gears free of contact with each other. In some cases, however, other types, such as centrifugal or turbine pumps, might be employed.

Liquid is introduced in the inlet 51 past the spring pressed or weighted foot valve 52 to the pump. This foot valve serves to maintain the dispensing line meter and flexible hose filled with liquid when the nozzle valve is closed. The discharge from the pump passes through the outlet 53. I also preferably provide a bypass outlet into the tank through the passage 54, the bypass valve 55 and the outlet opening 56 so that excess pressure of the liquid is relieved when necessary.

Means is provided in the bottom of the tank 30, in association with the dispensing line, for stopping the flow of fluid through the dispensing line in the event that accumulated water in the bottom of the tank rises to a predetermined maximum height, and which means is unaffected by the rise in the height of gasoline or other hazardous fuel.

In the bottom of the unit is located a float member 57 which carries a valve 58. This float sinks in gasoline or the liquid normally supposed to be in the tank but rises in case water, which is of greater specific gravity than gasoline, accumulates in the bottom of the tank above a predetermined level. When this occurs the float 57 is lifted and the valve 58 closes the inlet to the foot valve of the pump and thus instantly shuts off the discharge and notifies the attendant to inspect the tank and correct the difficulty by removing the water.

Figure 9:
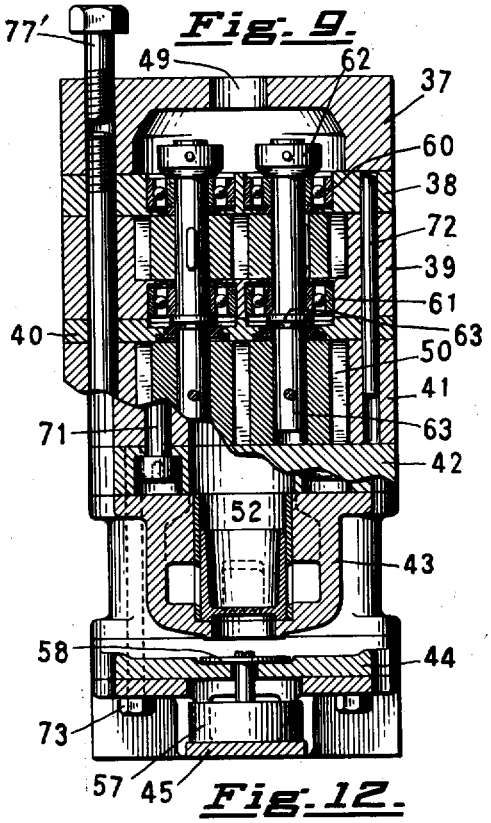
Fig. 9 is a vertical sectional view of one of the liquid motor and pump units, the section being taken partly on the plane of the line 9—9 of Fig. 11 and line 9X—9X of Fig. 13.
Figure 11:
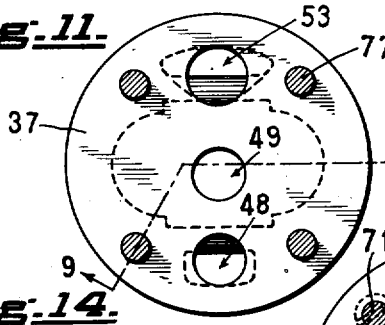
Fig. 11 is a plan view of the parts shown in Fig. 9.
Figure 12:
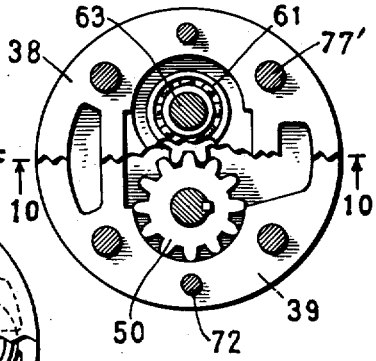
Fig. 12 is a partial section and plan on the planes of the lines 12—12 and 12X—12X of Fig. 10.
Figure 13:
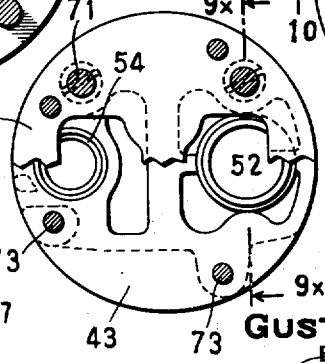
Fig. 13 is a section and plan on the planes of the lines 13—13 and 13X—13X of Fig. 10.
Figure 14:
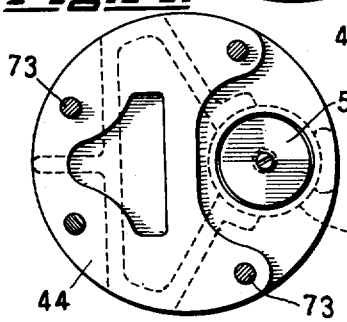
Fig. 14 is a section and plan on the plane of the line 14—14 of Fig. 10.

In the form shown in Fig. 9 each of the shafts 47 has a ball bearing 60 at its upper end and 61 below the motor member. This shaft has a collar 62 secured to its upper end which holds the upper bearing in place and it has a flange 63 on its lower end to hold the lower bearing in place. This latter flange also serves as a packing or metallic sealing device between the motor chamber and the pump chamber. The pressure of the oil or other hydraulic liquid in the motor chamber will always be greater than the pressure of the liquid in the pump unit so that the oil pressure or the like will ordinarily keep the bearing tight and in case of leakage the oil may pass into the pump chamber. This leakage would, however, be very slight.

Figure 15:
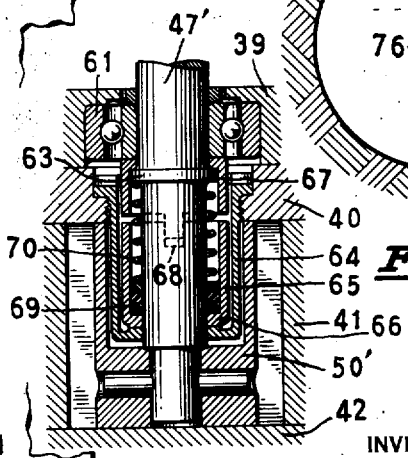
Fig. 15 is a vertical sectional view on a larger scale showing an alternative form of seal between a liquid motor and its pump.
Figure 26:
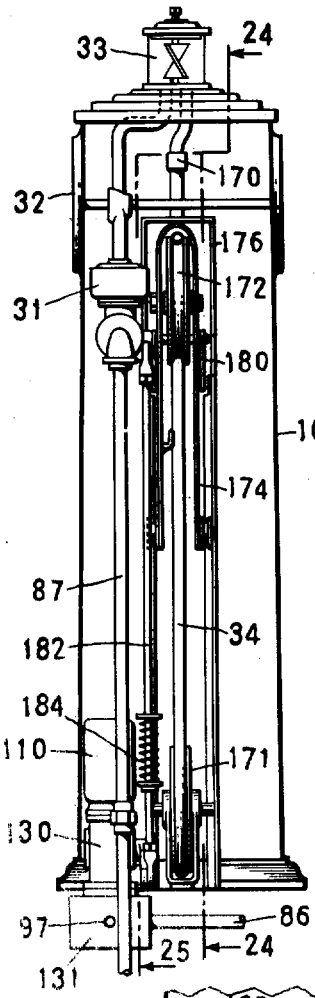
Fig. 26 is a side view and vertical section on the plane of the line 26—26 of Fig. 24.

One modification of this is shown in Fig. 15. In this case the pump member 50′ is keyed to the lower end of the shaft 47′ and is recessed to allow for the self adjusting sealing device which includes a cup-shaped member 64 which is screwed into the partition plate 40. Inside of the member 64 is a sleeve 65 which has a flange 66 which has a bearing against the bottom of the cup member 64.

A driving ring 67 is clamped between the bearing 61 and the flange 63 on the shaft so that it rotates with the shaft. The ring member 67 and the sleeve 65 have an interlocking key-like connection 68 so that they rotate together but so that the member 65 can move axially of the shaft and also have a certain degree of lateral freedom of movement. Packing ring or rings 69 of suitable resilient material is supported on the flange 66 in the sleeve 65 and is pressed downwardly by the spring 70 and the pressure of such hydraulic liquid as may leak into this space through the bearing above. In this way a complete seal is effected around the shaft 47′ and a sealing contact is maintained between the lower end of the sleeve 65 and the lower end of the cup 64 which contact permits of very considerable displacement of the shaft and/or pump member and yet insures a tight joint which maintains itself in a self adjusting relation.

In some cases the hydraulic motor members may be geared together by gears substituted for the collars 62. If it is desired to employ a positive displacement motor of the single rotor type or a motor of the turbine type, then one of the shafts 47 can be dispensed with. In that event a single rotor pump preferably of the centrifugal or turbine type will be used.

The parts of the combination motor and pump unit consisting of the members 37, 38, 39, 40, 41 and 42 and the enclosed members are held together by a number of bolts or cap screws 71 and may be further positioned by dowel pins 72. The water trap member and the inlet and feed valve sections are secured to the motor and pump unit by a number of bolts or cap screws 73 so that the trap and valve members may be removed for inspection and repair separately.

Figure 17:
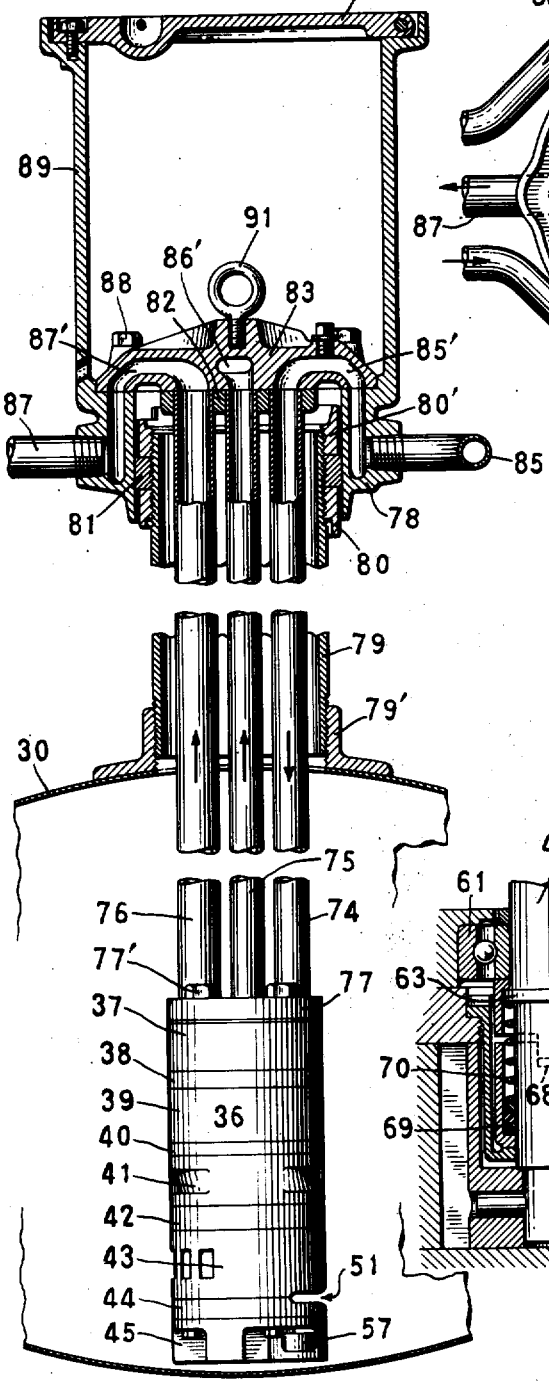
Fig. 17 is a vertical sectional view and side elevation of the parts shown in Fig. 16 but on a larger scale, the parts being broken away to save space.
Figure 18:
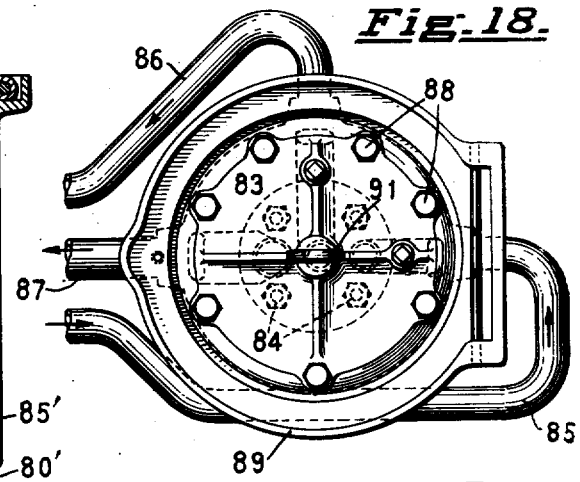
Fig. 18 is a plan view showing parts of the mechanism of Fig. 17.
Figure 16:
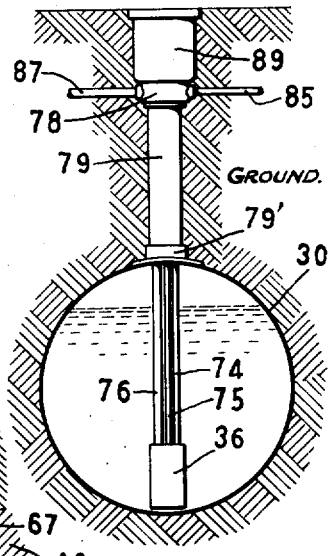
Fig. 16 is a vertical sectional view showing the installation of one of the motor and pump units in a subterranean storage tank.

Fig. 17 shows one method of supporting this motor and pump unit in the tank or reservoir 30.

The conduits or pipes 74, 75 and 76 have their ends connected to the top plate or flange 77 which is secured to the manifold 37 by bolts or cap screws 77′ and kept tight by suitable gaskets or otherwise. The pipe 74 registers with the oil inlet 48 and the outlet pipe 75 registers with the outlet passage 49. The gasoline pipe 76 registers with the outlet 53 previously described.

The casting 78 is suitably constructed to serve as a convenient means for installing pipe-line connections. This is mounted upon the upper end of a riser pipe 79, the lower end of which is screwed into a flange 79′ which is welded to the upper wall of the storage tank 30. The upper end of the riser is slidably connected with the casting 78 so as to maintain a tight connection to permit relative vertical adjustment or displacement of one with respect to the other.

Two threaded rings or nuts 80 and 81′ are screwed on to the upper end of the riser and an elastic packing ring 81 is provided which is tightly clamped between the nuts to provide a tight joint inside the casting 78.

The upper ends of the pipes 74, 75 and 76 are secured in a flange 82 corresponding to the flange 77 and secured to the bottom of the top manifold 83 by a number of screws or bolts 84 and the joints kept tight by a suitable gasket.

The inlet pipe 85 communicates with the pipe 74 by a passage 85′ part of which is in the casting 78 and the balance in the head plate 83. The outlet 75 registers with a passage 86′ in the head and the outlet pipe 86. The gasoline outlet pipe 76 at its upper end registers with a passage 87′ which in turn communicates with the pipe 87 which leads to the dispensing stand.

It will be seen that the entire motor and pump unit with the attached pipes 74, 75 and 76 and the head plate 83 constitute a unit which is adapted to be readily inserted and removed and held in place by cap screws 88 within the chamber 89 which forms an extension on the upper part of the casting 78. This chamber is normally closed by a suitable trap door 90. By opening this trap door and retracting the cap screws 88 the motor and pump unit may be readily withdrawn by means of the eyebolt 91. Obviously the joint between the rim of the head plate 83 and the upper face of the casting 78 will be suitably packed or sealed by a gasket.

It is apparent from the foregoing that such a construction can be permanently installed in the ground and the motor and pump unit can be readily inserted or removed without disturbing any of the pipe connections which lead to and from the tank and the motor unit.

It will also be seen that no electrical wiring and no mechanical parts are movable into or out of the tank during the ordinary use of the system. There is, therefore, no possibility of electric discharge, heat or sparks occasioned by friction or by the discharge of electricity.

The necessary hydraulic pressure for operating the motor is produced at some point remote from the dispensing stand. In this way any suitable liquid pressure creating means may be employed and driven by any suitable means such as an electric motor or belt-driven device which would be prohibited in usual systems of this type. Of course the primary or master pump unit may be suitably housed or protected against fire or other hazards depending upon the circumstances. It may be located, so far as the storage is concerned, so as to be entirely free of hazard by reason of its location alone.

A typical installation might include a master oil pump 92 driven by an electric motor 93. The pump may be of any suitable type but preferably of the positive displacement type, the capacity of which is practically independent of the pressure head against which it operates.

A reservoir 94 supplies oil to the pump through an inlet pipe 94'. A pipe line consisting of the parts 95, 96 and 97 connects the outlet of the pump 92 with the tank 94. There is also a bypass 98 leading from the pump outlet back to the pump inlet and the reservoir and the spring pressed valve 98' controls this passage which is opened only under pressures exceeding the maximum operating pressure.

A valve such as 99 and 99' is provided for each dispensing stand and the inlet and outlet oil pipes leading to the motor pump unit are connected to the outlet pipe from the master pump on either side of the respective valves. The master motor 93 and the pump 92 may be started in any suitable manner either by means of a switch 100 adjacent the motor or by a suitable switch located adjacent the dispensing stand if conditions there permit. When the master pump 92 is started oil is circulated through the pipe 95 and through the valve 99 (which is presumed to be set at right angles to the position shown in Fig. 1) and thence through pipe 96, valve 99', pipe 97 back to the reservoir 94. Such operation can be continued indefinitely although, of course, without performing any useful work and without any hazard at the dispensing stands since nothing is moving through the system except oil.

In case the valve 99 is set to the position shown in Fig. 1 by movement for instance of the handle 99A oil is diverted through the pipe 85 of the adjacent unit to the motor pump unit 36 to which it is connected. Thence the oil will pass through the hydraulic motor of that unit through the pipe 86 to the pipe 96 and so on back to the reservoir 94, thus setting in motion the pump unit of stand No. 2.

As long as the valve of the discharge nozzle is closed the gasoline will be circulated through the bypass and back into the storage tank. As soon as the discharge nozzle of that stand is open the gasoline will be discharged in the usual manner.

In case the valve 99' of stand No. 1 is turned at right angles the oil will be converted from pipe 96 through 85 to the pump unit of storage tank No. 1 and that pumping unit will operate in the same manner as previously described. It is obvious that either stand may be operated alone or the two may both be operated simultaneously. If there are more than two stations then the oil continues to pass through the various hydraulic motors which will all operate in series. All of the motors will thus operate at the same speed provided the master pump 92 is of the positive displacement type. The only difference will be the increased pressure required in the oil line and consequently the greater load on the electric motor.

If we assume the force necessary to operate a single hydraulic motor to be 100 pounds per square inch, then the master pump must deliver oil under this pressure plus the amount necessary to overcome pipe friction. For operating two hydraulic units simultaneously the pump pressure would be 200 pounds plus the pipe friction for the two units. For three or more units the pressure would be calculated in the same manner.

As soon as the control valve is turned to the position of the valve 99' for stand No. 1 the pump unit for that stand immediately stops. This does not affect the output of a master pump of positive displacement provided it is driven by a power source of constant speed such as a constant speed electric motor.

The control valves may be provided with a pull-back spring such as 101 (as shown in Fig. 6) to automatically stop the pumping unit when the valve is released.

The valve may also be controlled by a connection 102 connected to the discharge hose 34 so that the valve 99 will only be operated to start the motor when the hose 34 is drawn out or pulled away from the stand. It will be readily seen that with the system herein described the individual dispensing stands can be placed wherever convenient at any desired distances from the underground tanks to which they are connected since the operation of the pumping unit is not dependent upon suction and no consideration need be given to the question of lift or length of suction lines.

Only one master motor and pump is required and this may be located at any convenient distance either inside or outside of the station building. The motor and master pump, being remote from the vicinity of the gasoline, may be of any suitable design.

The construction illustrated in Fig. 4 is intended to start the master pump automatically whenever there is a demand at any one of the dispensing stands. The arrangement of the oil reservoir, master pumping unit and general conduit system and the construction of the combination motor and pump units associated with the respective storage tanks may be the same as heretofore described. In this case, however, a valve such as the valve 105 located at each dispensing stand is of the three-way type. A starting device 106 is provided, connected by pipe 107 to valve 105. This unit is also connected by pipe 108 with the oil reservoir. A valve 109 is normally open so that the conduit from the pump 92 is open through pipes 95, 96, valves 105' and 105, pipe 107, starting unit 106, pipe 108 back to the oil reservoir.

There is also for each valve 105 and 105' an individual pressure chamber 110 containing oil and communicating by pipe 111 with the pipe 96 or 95 as the case may be. A check valve 112 normally closes the entrance to each pipe 111 and a pipe 113 connects the bottom of each pressure chamber 110 with its respective three-way valve 105 or 105'. A check valve 114 normally prevents the passage of oil into pipe 85.

Pipe 115 connects pipe 95 with the upper end of the control unit beneath the plunger or piston 116 which is located beneath the switch arm 117 which controls the switch 118 in the motor circuit. A spring 119 tends to pull the switch arm 117 downward to open the circuit.

A second switch 120 is adapted to be closed by the lever 121 which is connected by a rod 122 with the piston 109. The spring 123 normally tends to draw the switch lever 121 downward. There is a passage 124 in the casing of the control unit 106 which is connected at one end to the space above the piston 109 and has two branches connected at their lower ends by the passage 125. One branch has an adjustable orifice controlled by a needle valve 126 and the other branch is controlled by a spring pressed valve 127. The switch lever 121 has an arm 128 adapted to be engaged by the piston 116.

When all of the valves 105, 105', etc., are closed, that is, in the position of valve 105 shown in stand No. 1 in Fig. 4, the pressure remains in the pressure chambers 110. As the motor pumping units have all been shut off and the main line is open, oil from the master pump 92 circulates freely with merely the pressure required to overcome friction in the pipe line. As this pressure is not sufficient to hold up the piston 116, the spring 119 draws down the switch arm 117 and opens the motor circuit so as to stop the master pump.

When the valve 105 is moved from the position shown at the left in Fig. 4, to the position corresponding to that of the valve 105', pressure from its starting chamber 110 forces oil through the valve 105 into the pipe 96 and back through valve 105' and the pipes 95 and 115 to lift the piston or plunger 116 and the switch lever 117 and close the switch 118 to start the electric motor and operate the pump. The full pump pressure is thus made available, as previously described with respect to the system of Fig. 1, and such pressure is sufficient to open the check valve 114 and operate the motor pump unit in the storage tank No. 1, as previously described.

When the valve 105' is in the position shown in Fig. 4, pressure from its pressure tank 110 forces oil through pipes 95 and 115 back to the unit 106 to lift the piston 116. Thus, the opening of either valve 105 or 105' serves to start the electric motor 93, and pressure from one of the tanks 110 will be exerted on piston 116 as long as either of them remains open.

In case the pressure in the chamber 110 has for any reason become so low, due to leakage or otherwise, that it is insufficient to lift up the plunger or piston 116 and start the motor, as above described, the motor circuit may be closed by means of the hand lever 121 and switch 120. The operation of this lever in an upward direction to close the circuit into the position shown in Fig. 5 lifts the piston valve 109 and thereby closes the connection between the return pipes 107 and 108 and forces liquid from above the piston valve 109 through the passage 106 and past the needle valve and the check valve back to the lower end of the piston valve chamber. At the same time the spring 123 is compressed, the motor is thus started and the master pump 92 delivers oil to the system.

Since the piston valve 109 shuts off the return connection the pressure is rapidly built up in the pipes 95 and 115 including the pressure chambers 110. This rising pressure in the pipe 115 soon becomes sufficient to lift the piston 116 and operate the switch lever 121 to open the circuit of the main power motor, thereby shutting off the master pump and leaving the system in condition to start automatically in the normal way whenever any one of the valves 105 or 105' is open.

The spring 123 serves to automatically draw down the switch lever 121 and open the switch through contacts 120 when the operator lets go of the lever 121. The return action, however, is retarded by the dash pot action of the piston valve 109 controlled by the passage of the oil past the needle valve 126 and blocked by the check valve 127. The system is therefore protected automatically against useless continued action and consequent loss and danger in case of a leak in the pipe line. In other words, the drop in pressure due to leakage in the system automatically shuts off the power and compels the attendant to inspect the system.

The three-way valve 105 and oil pressure chamber 110 are more fully shown in detail in Figs. 21, 22 and 23. For convenience in construction and installation the valve 105 is mounted in a valve casing 130 which is mounted on a bed plate 131 which contains the connections for the main line pressure pipes 96 and 107 and the local unit oil pipe connections 85 and 86.

The pressure chamber 110 may conveniently be bolted onto the upper end of the valve casing 130. The check valves 112 and 114 may also be conveniently located in passages in the casing 130 and made externally accessible for the purpose of insertion and adjustment. The position of the valve shown in Fig. 21 corresponds with the position of the left hand valve 105 in Fig. 4. The valve 105 can, of course, be operated by hand or automatically with the movement of the discharge hose, as described in reference to that shown in Fig. 6.

In the system illustrated in Figs. 6, 7 and 8, the main motor switch 140 is normally held open by a spring 141 and adapted to be closed by a piston 142 connected by a pipe 143 to the discharge pipe 95 leading from the master pump. This switch is also adapted to be closed by the action of plunger 144 and diaphragm 145, the upper surface of which is connected by pipe 146 to a series of control members, one located adjacent each of the oil valves 99, 99', etc. A spring 147 tends to lift the diaphragm 145. A reservoir 148 is connected to the upper side of the diaphragm 145 through a spring seated outlet valve 149 and a pressure relief valve 150.

The control valve shown in detail in Figs. 7 and 8 is mounted in a casing 151 and adapted to be actuated, as previously described, by the pull chain or rod 102 and the spring 101 in opposite directions.

The valve housing or casing 151 has a lower portion 152 and between them is located a diaphragm 153 which supports a plunger 154. The lower surface of the diaphragm 153 is normally raised by the spring 155' and the plunger 155. An oil chamber below the diaphragm communicates with the oil pipe 146 leading from the plunger 144 and a connecting pipe 146' leading to the next more remote dispensing unit. The valve arm 156 carries a cam member 157 normally under tension of the spring 158. When the valve 99 is operated to start the system, cam member 157 engages the upper end of the plunger 154 (which may be provided with an anti-friction roller) and forces the diaphragm 153 downward so as to force the liquid beneath the diaphragm back through the pipe 146 to the upper side of the diaphragm 145 and thus force the plunger 144 downward to close the switch 140 and start the operation of the motor and master pump.

As the valve lever 156 is operated to start the motor pump unit, the cam 157 passes across the top of the plunger 154 which then becomes free when the cam has passed over it. This allows the spring 155' to lift the plunger 155, diaphragm 153 and plunger 154. This action is also assisted by the pressure of oil from the pipe 146 caused by the action of the spring 147. The return movement of the plunger 154 is appropriately controlled in the nature of the dash pot action by the action of a needle valve 160 and a spring pressed valve 161.

As pressure has already been built up in the system, the plunger 142 is raised and holds the switch 140 closed regardless of the returning movement of the plunger 144. In fact, the master pump unit will continue to operate so long as there is a demand upon one or more of the dispensing stands.

When the valve 99 which has been operated is released or returned to its closed position, the cam member 157 is permitted by its hinged action to snap over the top of the plunger 154 without affecting or operating the same. When all of the dispensing stands are shut off the pressure in the main pipe line drops and the spring 141 opens the switch 140 and shuts off the power motor.

Figs. 19 and 20 show an alternate method of installation of the motor pump unit 36 in a storage tank 30'. In this case the manifold 78' is mounted in the top of the tank and welded or otherwise permanently secured thereto. The flange 82' is in this case secured to the underside of the manifold 78' by cap screws 84'. It is obvious that the length of the pipes 74, 75 and 76 will be made such as to properly locate the inlet of the motor pump unit in the proper position in the storage tank and, in fact, the motor pump unit might be secured directly to the bottom of the manifold 78'. While I have shown a motor pump unit in which the inlet is at the bottom and the outlet is at the top, it should be understood that the invention in its broader aspect is not limited to such a construction or arrangement.

To install a motor pump unit in this manner I provide a hand hole or man hole with a cover plate 163 through which the motor pump unit with the interior connections may be inserted or removed.

So far as the motor and pump system is concerned it is immaterial how the discharge hose and nozzle are constructed and installed but the fact that the power unit is located remotely to the dispensing stand makes it possible to provide other conveniences and safeguards within a space corresponding to that ordinarily employed in installations of this character.

In Figs. 24 to 27, inclusive, I have shown a service station pump having novel features of utility in connection with the system above described, and also having independent utility and which may be coordinated with other methods of gasoline supply. In this construction I have shown a gasoline service station pump having an upstanding housing provided with hose storing means arranged normally to store the flexible hose thereon within the housing, the arrangement being such that by pulling upon the hose a length of the latter may be progressively extended through a hose opening in the housing from the hose storing means, the extension of the hose being preferably accompanied by the automatic operation of the flow establishing means through the hose so that when the nozzle valve of the hose is opened, fuel flow will immediately take place, and/or conversely when tension is relieved in the hose, the storing mechanism will automatically cause the retraction of the hose into the housing and will preferably automatically stop the flow of liquid through the hose.

The main housing 169 includes the rigid gasoline pipe 87 forming a part of the dispensing line, previously mentioned, together with the meter 31, the indicator 32, and the visible gauge 33. It also may conveniently include the automatic valve 105 enclosed in the casing 130. I have also shown in connection with this valve the simplified installation embodying the pressure chamber 110 and the connections for the oil pressure pipes 85, 86, 96 and 97.

Figure 24:
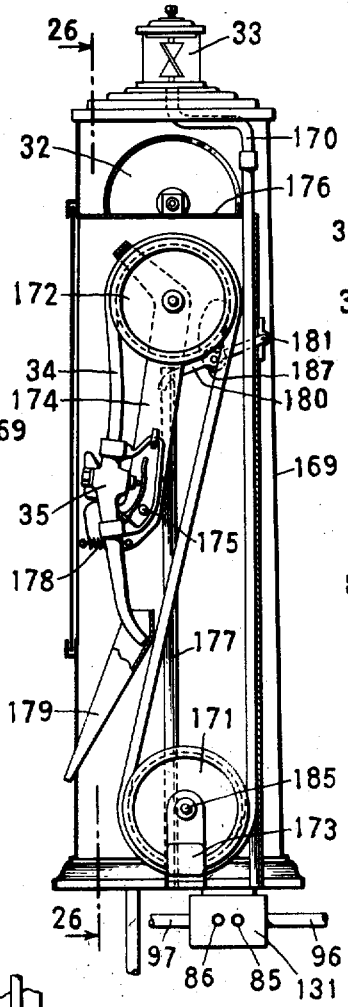
Fig. 24 is a vertical projection and section on the plane of the line 24—24 of Fig. 26.

The flexible dispensing hose 34 has a suitable terminal nozzle 35 and has its inner end connected to the rigid dispensing discharge line 170 from the visible gauge. This hose is normally supported by means comprising pulleys 171 and 172 in the position shown in Figs. 24 and 26. The pulley or sheave 171 is provided with a weight 173 and the pulley 172 is mounted on a nozzle supporting arm 174 hinged at 175. These pulleys may conveniently be installed in a separate compartment or well 176 within the main housing 169. The pulley 171 and its weight 173 are guided vertically behind vertical rails 177 so that the pulley can rise and fall but will stay within the casing 176. The arm 174 is under tension of spring 178 which has its front end attached to the casing 176. The tension of this spring, together with the weight of the pulley 171 and attached parts, tends to hold the arm 174 and pulley 172 in the position shown in Fig. 24. When the nozzle 35 and attached hose are pulled out the pulley 171 is raised and the pulley 172 swings outwardly substantially out of the housing into the position shown in Fig. 27, leaving the nozzle and hose free to be moved about for convenience in dispensing the gasoline. When the nozzle is released the weight of the pulley 171 and attached parts pulls downwardly on the hose so that the nozzle is retracted into the casing as shown in Fig. 24, the movement of the arm 174 and pulley 172 being expedited by the spring 178. This affords a simple but compact and practical method of automatically retracting the hose and stowing away the nozzle into the casing where it can be locked or otherwise secured in any suitable manner (not shown).

Figure 27:
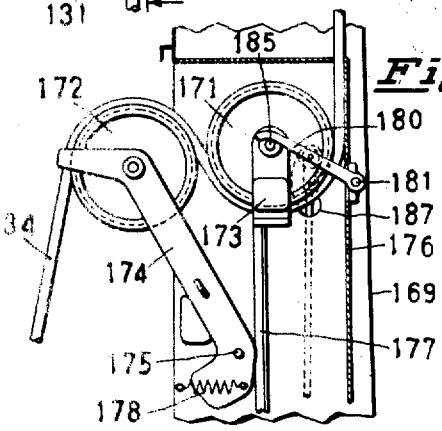
Fig. 27 is a fragmentary side view on the same plane as Fig. 24 but showing the dispensing hose and its supporting pulley drawn out for use.

It will be noted that shiftable arm 174 forming a part of the hose storing means is provided with a hook adapted to receive the handle of the hose nozzle whereby the hose nozzle may be supported on this arm 174 when not in use and it likewise will be noted that the upper portion of the arm 174 is formed as a yoke adapted to overlie the circumferential portion or rim of the pulley 172, embracing a part of the hose which seats within this rim, whereby to maintain the hose within the rim of the reel 172 and particularly when the latter is in outwardly shifted position, as shown in Fig. 27, whereby to hold or maintain the hose on the pulley irrespective of the lateral direction in which the hose is pulled with respect to the vertical plane of rotation of the pulley 172.

As an additional safety precaution I may provide an inclined drip pan 179 which serves as an abutment for the outlet end of the nozzle 35 so that any gasoline which may remain in the nozzle or discharge end of the hose will be diverted outside the casing where it can evaporate without doing any harm.

Figure 25:
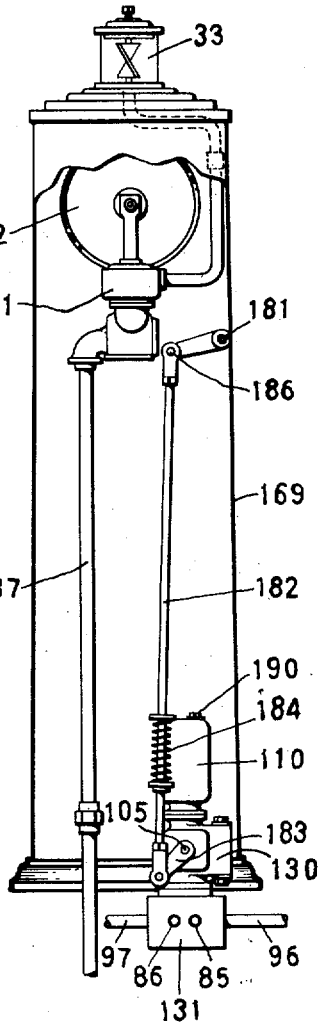
Fig. 25 is a section and side elevation on the plane of the line 25—25 of Fig. 26.

The action of the nose and nozzle above described may very conveniently be utilized for the operation of the valve 105 for controlling the starting and stopping of the master pump unit, previously described. For this purpose I provide a lever 180 which is pivoted at 181 and connected by a rod 182 to the lever 183 of the control valve 105. A spring 184 may be mounted on the rod 182 to augment the effect of gravity in holding the lever 180 and rod 182 normally downward, as shown in Fig. 25 in the non-actuating position of the valve 105. The shaft 185 of the pulley 171 engages the lever 180 when the pulley is raised to the position of Fig. 27. For convenient balancing of forces the lever 180 is in the form of a fork with two arms to be engaged by the opposite ends of the shaft 185, and a connection 186 to the rod 182 passes through a slot 187 in one wall of the casing. This lifting of the lever 180 and the attached rod 182 operates the valve 105 to start the master pump action, as previously described. When the nozzle and hose are released either accidentally or intentionally the pulley 171 descends and the lever 180 being released, the spring 184 assisted by the weight of the attached parts immediately shuts off the valve 105 and stops the master motor and pump unless some other stand demands its continued service.

The pressure chamber 110 utilized for starting the master pump unit serves as a convenient means at the stand for providing an extra safety device for making it impossible to start the master pump in case of a fire at the dispensing stand. For this purpose a fusible plug 190 may be provided in a wall of the pressure chamber 110. In case of a rise of temperature above a predetermined safe degree, this plug will melt and release the pressure in the chamber 110, thus making it impossible to start the master pump unit even if the valve 105 is operated.

An extra precautional protection may also be provided at the master pump unit by arranging for the creation of an automatic leak in the oil line or by providing a fusible link in the electric power line, thereby safeguarding the entire system against either intentional or accidental operation of the system in case of fire.

The invention is hereby claimed as follows:

1. A pumping system for dangerous liquids comprising a master pump and connected conduit, a remote motor-pump unit driven by liquid forced through the conduit by the master pump, and means for automatically disabling the master pump in case of a leak in the conduit.

2. In a system for supplying dangerous liquids, a supply reservoir and conduit normally under atmospheric pressure, a liquid driving motor pump connected to the conduit, an electrically driven master pump, a pressure closed switch mechanism for controlling the starting of the master pump, a valve for controlling the conduit to the motor pump, means for storing pressure during the operation of the master pump, means for transmitting this stored pressure to said switch mechanism to start the master pump when the valve is opened to admit liquid to the motor pump, means for maintaining pressure on the switch mechanism while the system is operating, and means actuated by the valve to reduce the pressure in the system so as to open the switch and stop the master pump.

3. A pumping system comprising a master pump and a circulating conduit for liquid, a storage tank, a motor pump connected to the conduit and adapted to raise liquid from said tank, a local source of pressure, a pipe and valve mechanism for connecting the local source of pressure to the conduit and for diverting liquid to the motor-pump, means connected to the conduit to be actuated by pressure from the local source of pressure for starting the master pump when the valve mechanism is actuated to start the motor pump.

4. A gasoline pumping system including a storage tank, a motor-pump unit submerged in the tank and a float valve in the bottom of the unit to shut off the pump automatically when the level of water in the tank reaches a predetermined maximum height in the tank.

5. A pumping system comprising a main housing, a motor pump for forcing liquid out of the housing, a hose, a guide pulley for the hose mounted in the housing and supported to move into and out of the housing with the hose, and a drain for carrying drip from the hose outside the housing.

6. In a system for pumping volatile liquids, a storage tank for the liquid, a liquid driven motor pump unit submerged in the liquid of the tank near the bottom thereof and having an inlet for the volatile liquid at the bottom of the unit and an outlet for said liquid at the top of the unit and a valve in the bottom of the unit and means controlled by the action thereof to stop the operation of the pump automatically in case water in the tank rises to a predetermined maximum depth in the tank.

7. In a system for pumping a volatile liquid, a closed storage tank for the liquid having a discharge outlet pipe, a liquid motor driven pump submerged in the liquid in the tank for forcing liquid from said pipe, the liquid in the pump and attached conduits being normally under atmospheric pressure, a liquid circulating system connected to the motor having a supply reservoir and an electrically driven pump for forcing liquid from the reservoir through the circulating system and returning the liquid to the reservoir, a valve in the circulating system located outside of the tank and between the inlet and outlet to the submerged liquid motor driven pump for controlling the starting and stopping of the electrically driven pump and pressure actuated means for actuating said valve.

8. In a system for pumping a volatile liquid, a closed storage tank for the liquid having a discharge outlet pipe, a liquid motor driven pump submerged in the liquid in the tank for forcing liquid from said pipe, the liquid in the pump and in the attached conduits being normally under atmospheric pressure when the system is not pumping, a liquid circulating system connected to the motor having a supply reservoir and an electrically driven pump for forcing liquid from the reservoir through the circulating system and returning the liquid to the reservoir and a valve controlled source of pressure for effecting the operation of the electrically driven pump.

9. In a system for pumping a volatile liquid, a closed storage tank for the liquid having a discharge outlet pipe, a liquid motor driven pump submerged in the liquid in the tank for forcing liquid from said pipe, the liquid in the pump and in the attached conduits being normally under atmospheric pressure when the system is not pumping, a liquid circulating system connected to the motor having a supply reservoir and an electrically driven pump for forcing liquid from the reservoir through the circulating system and returning the liquid to the reservoir and a manually controlled device including a valve located in the circulating system for starting and stopping the electrically driven pump simultaneously with the submerged liquid motor driven pump.

10. In a pumping system for hazardous liquids, a series of storage tanks for such liquids, a combined liquid motor and supply pump unit associated with each tank so that the pump can force liquid from the tank, a main conduit, a master pump for circulating a power liquid through said main conduit, a pair of branch conduits connecting said main conduit with each liquid motor unit, valves in the main conduit between the ends of the respective branch conduits normally permitting liquid to flow through the main conduit without actuating the liquid motor and supply pump units, said valves being adapted to close the main conduit and divert liquid through the respective branch conduits and the liquid motors at the tanks when it is desired to actuate the supply pumps, said valves being independently operable to permit selective operation of the respective supply pumps.

11. In a pumping system for hazardous liquids, a plurality of tanks, an hydraulic motor in each tank, a master pump for supplying liquid to the various tank motors, a pump in each tank, means for supplying each tank with liquid, means for withdrawing the pumped liquid from each tank, and means for starting and stopping the master pump for operating any of the tank motors, whereby each tank and its discharge means may be normally without pressure when not in use, a supplemental pressure tank adapted to retain pressure when said tanks do not, and means for starting the master pump in response to the pressure in said supplemental pressure tank.

12. In a pumping system for hazardous liquids, a plurality of tanks, an hydraulic motor in each tank, a master pump for supplying liquid to the various tank motors, a pump in each tank, means for supplying each tank with liquid, means for withdrawing the pumped liquid from each tank, and means for starting and stopping the master pump for operating any of the tank motors, whereby each tank and its discharge means may be normally without pressure when not in use, a supplemental pressure tank adapted to retain pressure when said tanks do not, and means for starting the master pump in response to the pressure in said supplemental pressure tank, and a thermal means for releasing pressure in said supplemental pressure tank in response to a predetermined temperature.

13. In a pumping system for volatile hazardous liquids, a plurality of tanks, a fluid motor and pump for each tank adapted to force the contents from said tank, a movable pipe through which the liquid from each of said tanks is discharged, a master pump for supplying fluid to operate each of the tank motors, a supplemental pressure tank for retaining some of the master pump fluid under pressure when said master pump is not in operation, a valve for each of said plurality of tanks for controlling the supply of said master pump fluid to the tank motor, each of said valves being also adapted to release pressure from said supplemental tank, and means responsive to the release of pressure from said supplemental tank for starting the master pump.

14. In a pumping system for volatile hazardous liquids, a plurality of tanks, a liquid motor and pump for each tank adapted to force the liquid from the tank, a master pump f r supplying liquid to operate each of the motors, a supplemental pressure means adjacent each tank, a switch member for starting the master pump by closing a circuit on transmission of a predetermined pressure from said supplemental pressure means, means for opening said switch member when the pressure falls below a predetermined value, a valve for each tank adapted to connect or disconnect its tank motor with the master pump, and means for transmitting the pressure of said supplemental pressure means to said switch member for starting the master pump.

15. In a pumping system for volatile hazardous liquids, a plurality of tanks, a liquid motor and pump for each tank adapted to force the liquid from the tank, a master pump for supplying liquid to operate each of the motors, a supplemental pressure means adjacent each tank, a switch member for starting the master pump by closing a circuit on transmission of a predetermined pressure from said supplemental pressure means, means for opening said switch member when the pressure falls below a predetermined value, a valve for each tank adapted to connect or disconnect its tank motor with the master pump, and means responsive to movement of said valve for transmitting the pressure of said supplemental pressure means to said switch member for starting the master pump, a movable pipe for each tank through which liquid is discharged therefrom, means connecting the valve and discharge pipe of each tank so that the valve is moved in response to movement of the discharge pipe and the master pump started.

16. In a pumping system for volatile hazardous liquids, a plurality of tanks, a liquid motor and pump for each tank adapted to force the liquid from the tank, a master pump for supplying liquid to operate each of the motors, pipe lines to supply liquid from the master pump to the liquid motor, a supplemental line extending adjacent each tank, a switch member for controlling the master pump operation in closing a circuit on attainment of a predetermined pressure in said supplemental line, means for opening said switch member when the pressure in said line falls below a predetermined value, a valve for each tank adapted to connect or disconnect its tank motor with the master pump, and means responsive to movement of said valve for increasing the pressure in said supplemental line for starting the master pump, a movable pipe for each tank through which liquid is discharged therefrom, means connecting the valve and discharge pipe of each tank so that the valve is moved in response to movement of the discharge pipe and the master pump started, a manually operable switch member for closing said circuit in place of the first mentioned switch member, and means interconnecting said switch members to allow the selective operation of one but not both of them.

17. In a dispensing apparatus, the combination of a housing, a hose terminating in a nozzle, means for supplying a flow of fluid to said nozzle, hose storing means in said housing, adapted to yield said hose in response to tension applied at the nozzle end thereof and to retrieve said hose when tension thereon is relaxed, and means operable by said storing means to render said flow supplying means effective as hose is yielded and to render said flow supplying means ineffective as hose is retrieved.

18. In a gasoline dispensing device, the combination of means forming a housing enclosing a portion of the dispensing line having a connection with an underground source of liquid to be dispensed, a flexible hose connected at one end to the line and having a nozzle at the other end, hose storing means shiftably mounted in the housing and upon which the hose is adapted to be supported when not in use, said storing means being constructed and arranged to yield said flexible hose through an opening in the housing when tension is exerted upon the nozzle end of the hose, and automatically to retract said hose within the housing when tension is relieved upon the hose, said hose storing means including an arm pivotally mounted on the housing and having a hose carrying portion thereof adapted to shift into and out of the housing during the hose yielding and retracting movements, said shiftable arm having means thereon for supporting the nozzle within the housing when the hose is not in use, a flow supplying means in the dispensing line and means operable by said storing means to render said flow supplying means effective as hose is yielded and to render said flow supplying means ineffective as hose is retracted.

19. In a gasoline dispensing device, the combination of means forming a housing enclosing a portion of the dispensing line having a connection with an underground source of liquid to be dispensed, a flexible hose connected at one end to the line and having a nozzle at the other end, hose supporting means including a rotatable support around which the hose is partially wound, means for shiftably mounting said support to permit the same to be moved into and out of the housing during yielding and retracting movements of the hose, and means associated with the rotatable support and adapted to embrace the hose thereby to hold said hose upon said rotatable support when the latter is projected outside of the housing, irrespective of the angular direction to which the hose is pulled relatively to said housing, flow supplying means in the dispensing line and means operable by a portion of said supporting means to render said flow supplying means effective as hose is yielded and to render said flow supplying means ineffective as hose is retracted.

20. A liquid dispensing apparatus comprising a dispensing line adapted to be connected to a source of liquid supply, said dispensing line terminating in a dispensing nozzle, and said dispensing line adjacent the nozzle end thereof comprising a length of flexible hose, a pump for propelling liquid through the dispensing line and hose, a motor for driving the pump, means for controlling the operation of the motor, a valve carried by the dispensing nozzle for controlling the liquid flow through the dispensing line, a liquid displacement meter disposed in said line in advance of said flexible hose and operated by the flow of liquid through said line and hose, means for maintaining said flexible hose and liquid displacement meter full of liquid when said valve is closed, a housing within which a length of said flexible hose full of liquid is adapted to be enclosed upon termination of dispensing and from which said length of hose may be manually withdrawn for dispensing, said housing also enclosing said meter, and storage means for urging said hose length full of liquid into position within the housing, said storage means including a yieldably mounted rotary member for storing a portion of the hose in coiled position, and also including a rotary member for guiding the hose outwardly through the housing.

21. A liquid dispensing apparatus comprising a dispensing line adapted to be connected to a source of liquid supply, said dispensing line terminating in a dispensing nozzle, and said dispensing line adjacent the nozzle end thereof comprising a length of flexible hose, a pump for propelling liquid through the dispensing line, a motor for driving the pump, means for controlling the operation of the motor, a valve carried by the dispensing nozzle for controlling the liquid flow through the dispensing line, a liquid displacement meter in said line in advance of the flexible hose, a check valve disposed in the dispensing line between said flexible hose and the source of supply and in advance of said meter for maintaining the hose and meter constantly full of liquid, a housing within which a length of said flexible hose full of liquid is adapted to be enclosed in bended position and from which said hose full of liquid may be manually withdrawn, said housing also enclosing said meter, and storage means for urging said hose length full of liquid into bended position within the housing, said storage means including a yieldably mounted rotary member for storing a portion of the hose in bended position, and also including a rotary member mounted for bodily shiftable movement for guiding the hose outwardly through the housing.

22. A liquid dispensing apparatus comprising a dispensing line adapted to be connected to a source of liquid supply, said dispensing line terminating in a dispensing nozzle, and said dispensing line adjacent the nozzle end thereof comprising a length of flexible hose, a pump for propelling liquid through the dispensing line, a motor for driving the pump, means for controlling the energization of the motor, a valve carried by the dispensing nozzle for controlling the liquid flow through the dispensing line, a liquid displacement meter in said line in advance of said flexible hose, means for maintaining said hose and meter full of liquid when said valve is closed, a housing within which a length of said flexible hose full of liquid is adapted to be enclosed and from which it may be manually withdrawn, a nozzle support structure upon which the dispensing nozzle is adapted to be supported when not in use, said motor controlling means and said dispensing nozzle valve being arranged so that the motor is deenergized and said nozzle valve is closed when the dispensing nozzle is in supported position upon its support structure, and yieldable means automatically operable to urge said hose length full of liquid into position within the housing when the dispensing nozzle is arranged on its said support structure.

23. A liquid dispensing apparatus comprising a dispensing line adapted to be connected to a source of liquid supply, said dispensing line terminating in a dispensing nozzle, and said dispensing line adjacent the nozzle end thereof comprising a length of flexible hose, a pump for propelling liquid through the dispensing line, a motor for driving the pump, means for controlling the operation of the motor, a valve carried by the dispensing nozzle for controlling the liquid flow through the dispensing line, means for maintaining said hose full of liquid on closure of said valve, a housing within which a length of said flexible hose full of liquid is adapted to be enclosed and from which it may be manually withdrawn, and yieldable means for urging said liquid filled hose length into position within the housing, said yieldable means comprising rotatable weighted means having an arcuate hose guiding surface around which said hose length full of liquid is adapted to be engaged, said weighted means being adapted to be slidably raised against the action of gravity as the filled hose is manually withdrawn from the housing, a guide structure for guiding the weighted means in its sliding movements, and additional rotary means for guiding the hose from the rotatable weighted means outwardly through the housing.

24. A liquid dispensing apparatus comprising a dispensing line adapted to be connected to a source of liquid supply, said dispensing line terminating in a dispensing nozzle, and said dispensing line adjacent the nozzle end thereof comprising a length of flexible hose, a pump for propelling liquid through the dispensing line, a motor for driving the pump, means for controlling the operation of the motor, a valve carried by the dispensing nozzle for controlling the liquid flow through the dispensing line, means for maintaining said hose full of liquid when said valve is closed, an upstanding housing within which a length of said flexible hose is adapted to be enclosed and from which it may be manually withdrawn, said housing comprising a substantially rectangularly-shaped structure of greater height than width, and yieldable guide means for urging said hose length into position within the housing, said guide means comprising a roller guide structure disposed in the upper portion of the housing for guiding the hose substantially across a lateral dimension of the housing, and a roller guide structure disposed in the lower portion of the housing for guiding the hose from the upper guide structure substantially across a lateral dimension of the housing, said lower guide structure being adapted to be slidably raised in a direction parallel to the vertical axis of the housing against the action of gravity as the hose is manually pulled.

25. In a system for pumping a volatile liquid, a storage tank for the volatile liquid, an opening in said tank, a manifold secured to said tank above said opening, said manifold having fixed pipe connections for external delivery of pumped volatile liquid and for lead-in and lead-out connections for motor power liquid, and a motor and pump unit readily insertable into and removable from said tank without disturbing any of said pipe connections comprising a combined pump and motor and attached pipes for pumping liquid from said tank and for leading in and leading out motor power liquid to operate the pump, the said motor and pump unit being insertable and removable as a body into and from said tank, said attached pipes being arranged to communicate with the corresponding pipe connections in said manifold.

26. In a system for pumping a volatile liquid, a storage tank for the volatile liquid, an opening in said tank, a riser casing extending from said tank at said opening, a manifold and fixed pipe connections secured to said riser casing for external delivery of pumped volatile liquid and for lead-in and lead-out connections for motor power liquid, and a motor and pump unit readily insertable into and removable from said tank without disturbing any of said pipe connections comprising a combined pump and motor and attached pipes for pumping liquid from said tank and for leading in and leading out motor power liquid to operate the pump, the said motor and pump unit being insertable and removable as a body through said riser casing and tank opening and into and from said tank, said attached pipes being arranged to communicate with the corresponding pipe connections in said manifold.

27. A dispensing apparatus as defined in claim 17, wherein said means operable by the hose storing means renders the flow supplying means ineffective upon the initial retrieving motion of the hose.

28. In a dispensing apparatus, the combination of a housing, a hose terminating in a nozzle, means for supplying a flow of fluid to said nozzle, hose storing means including a yieldably mounted rotary member in said housing, adapted to yield said hose in response to tension applied at the nozzle end thereof and to retrieve said hose when tension thereon is released, and means operable by said storing means as said rotary member reaches predetermined positions to render said flow supplying means effective as hose is yielded and to render said flow supplying means ineffective as hose is retrieved.

29. A liquid dispensing apparatus as defined in claim 22, wherein said yieldable hose urging means comprises a yieldably mounted rotary member disposed within the housing adapted to engage and control the flexible hose in its movements.

30. A liquid dispensing apparatus as defined in claim 22, wherein said yieldable hose urging means comprises a yieldably mounted rotary member disposed within the housing adapted to engage and control the flexible hose in its movements, said rotary member being bodily shiftable within the housing along a reciprocatory path of travel as the hose is extended and retrieved.

31. A liquid dispensing apparatus comprising a dispensing line adapted to be connected to a source of liquid supply, said dispensing line terminating in a dispensing nozzle, and said dispensing line adjacent the nozzle end thereof comprising a length of flexible hose, a pump for propelling liquid through the dispensing line, a motor for driving the pump, means for controlling the operation of the motor, a valve carried by the dispensing nozzle for controlling the liquid flow through the dispensing line, means for maintaining said hose full of liquid when said valve is closed, an upstanding housing within which a length of said flexible hose is adapted to be enclosed and from which it may be manually withdrawn, said housing comprising a substantially rectangularly-shaped structure of greater height than width, and yieldable guide means for urging said hose length into position within the housing, said guide means comprising an auxiliary well within the housing and extending vertically thereof, a guide structure disposed at the upper end of said well for supporting said length of flexible hose toward the nozzle end thereof, a guide structure disposed at the lower end of said well to which the hose extends from the upper guide structure, said lower guide structure including a member adapted to engage and control the hose in its movements, said last named member being shiftable vertically of said well along a predetermined reciprocatory path of travel as the hose is extended and retrieved, and means for guiding said last named member in its movements.

GUSTAVE A. UNGAR.